ANALOG VOLTAGE TO TIME DURATION CONVERTER

Filed Oct. 8, 1965

INVENTOR.
EDVARD MUNCH
BY [signature]
ATTORNEY

United States Patent Office 3,390,354

Patented June 25, 1968

3,390,354

ANALOG VOLTAGE TO TIME DURATION CONVERTER

Edvard Munch, Fremont, Calif., assignor, by mesne assignments, to The Rucker Company, Oakland, Calif., a corporation of California Filed Oct. 8, 1965, Ser. No. 494,151
7 Claims. (Cl. 332—9)

ABSTRACT OF THE DISCLOSURE

An analog voltage to time duration converter utilizing a ramp generator including a Miller integrator having a switch across its feedback capacitor for discharging the capacitor and for applying the same voltage to both the generator input and output terminal. A first comparator compares the ramp voltage with the analog voltage, and provides a first comparator output signal when they are equal. This comparator output signal is used to trigger a bistable multivibrator which provides the pulse whose width reflects the analog signal. A second comparator compares the ramp voltage with a reference voltage, and provides a second comparator output signal when they are equal. This second comparator output signal is used to trigger the switch across the feedback capacitor.

Figure 1:
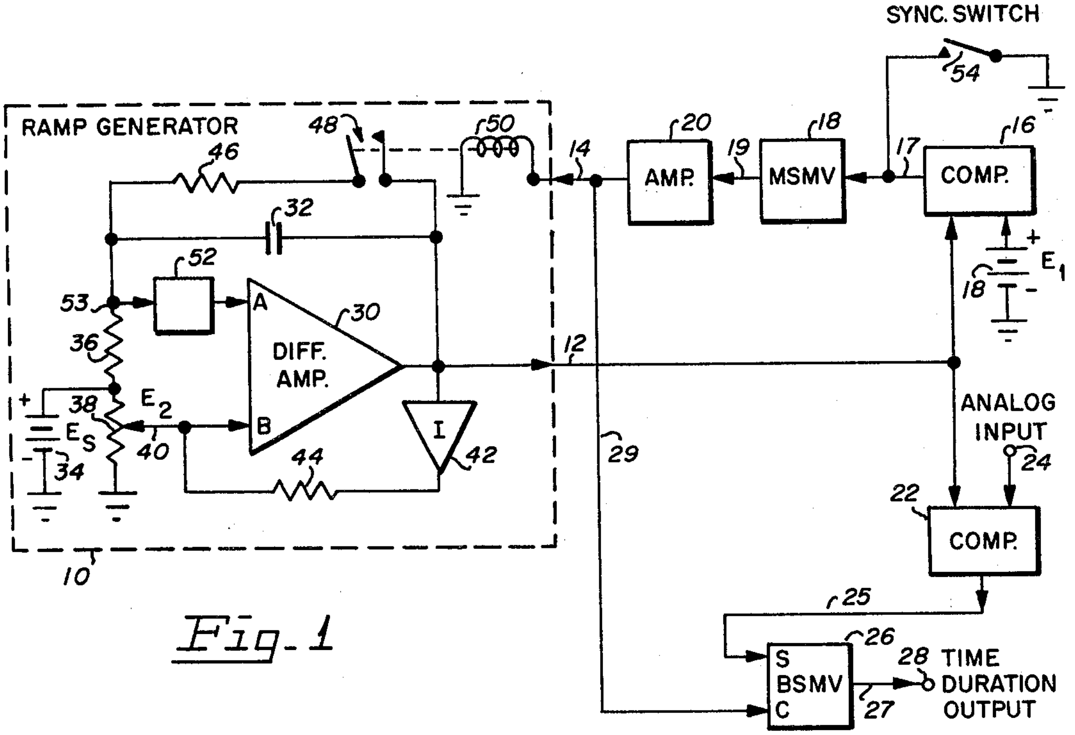

This invention relates to the conversion of data from analog voltage to time duration form, and has particular reference to an improved and simplified analog voltage to time duration converter for accomplishing this function.

It is often necessary to convert a continuous function represented by a varying voltage, henceforth called the analog voltage, to variable width pulses having a duration determined by the amplitude of the analog voltage. The variable width pulses are related to and measured against a fixed time interval or period. This period represents the duration of one cycle of a repetitious voltage vs. time signal. The variable width pulses may be recorded on a recorder having a timing track for determining the pulse width and thereby provide an indication of the amplitude of the varying voltage, or may be employed to control the transmission of constant frequency reference pulses to a counting circuit to provide a digital indication of the varying voltage. If the variable width pulses are utilized in the last stated manner, an analog to digital converter is provided.

Analog voltage to time duration converters, to which this invention relates, utilize a voltage reference in the form of a ramp voltage and compare this reference with the analog voltage to be converted to a time duration pulse. The width of the timing pulse is proportional to the time it takes the ramp voltage to change in amplitude from a starting value to the amplitude of the applied analog signal.

One of the problems encountered in this type of prior art analog voltage to time duration converters is that the return of the ramp voltage to the starting ramp voltage utilizes a substantial portion of ramp voltage period. More particularly, the flyback or return time in prior art converters is usually a substantial part of the ramp period. Since, during the flyback time of the cycle, the ramp voltage cannot be utilized for accurately converting the analog voltage to a time duration, the range efficiency and usefulness of such prior art converters is limited to substantially less than the ramp voltage period.

It is therefore a primary object of this invention to provide an analog voltage to time duration converter which utilizes a much larger portion of the ramp voltage period than has been possible heretofore to provide useful and accurate conversion.

It is a further object of this invention to provide an analog voltage to time duration converter which is accurate, reliable and efficient, and capable of handling time durations from below one second to above fifteen seconds.

It is another object of this invention to provide a ramp voltage type analog voltage to time duration converter having a flyback time which is but a negligible fraction of the ramp voltage period so that the useful time interval closely approaches 100% of the ramp voltage period.

It is still another object of this invention to provide an improved ramp generator which has a very short flyback time and which provides a ramp voltage of great linearity.

Briefly, the analog voltage to time duration converter of this invention utilizes a ramp generator which includes a differential amplifier with capacitive feedback to form a Miller integrator arrangement. The charging capacitor is paralleled by a low resistance discharge path, which includes a discharging switch, for discharging the capacitor and for connecting the ramp generator output to a first input for the purpose of restoring the initial ramp voltage. The ramp voltage cycle is started by opening the discharging switch causing the ramp voltage to decrease linearly.

The decreasing ramp voltage is compared with the analog signal to be converted in a comparator which provides an output signal when the applied analog voltage equals the ramp voltage. The comparator output signal is utilized to set a timing device to indicate the start of the variable width timing pulse. The timing device is usually a bistable multivibrator.

The ramp voltage is also continuously compared with a voltage reference in a comparator which provides an output signal when the amplitude of its reference voltage equals that of the ramp. This output signal is utilized to close the discharging switch just long enough to allow the capacitor in the feedback path to discharge to permit the ramp voltage to assume its initial value, and thereafter to open the discharging switch and start the next ramp cycle.

Further objects and advantages of the present invention will become apparent to those skilled in the art to which the invention pertains as the ensuing description proceeds.

Figure 2:
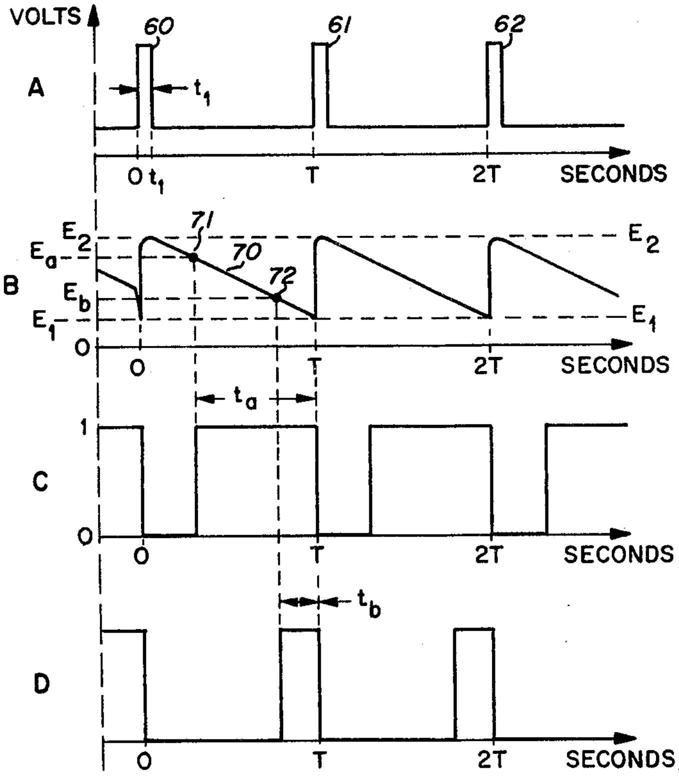

The features of novelty that are considered characteristic of this invention are set forth with particularity in the appended claims. The organization and method of operation of the invention itself will best be understood from the following description when read in connection with the accompanying drawing in which:

FIGURE 1 is a schematic block diagram, with certain portions shown in the schematic circuit form, of the analog voltage to time duration converter in accordance with the present invention; and FIGURE 2 shows a series of wave forms appearing at various points in the block diagram of FIGURE 1.

Referring now to the drawing and preliminarily to FIGURE 1 thereof, there is shown a ramp generator 10 which supplies a sawtooth wave signal, also referred to as a ramp voltage, along an output lead 12, and which has applied to it a triggering pulse, along an input lead 14, to initiate a new ramp voltage period.

Ramp generator output lead 12 is connected to one of the input terminals of a first comparator means 16 which has its other input terminal connected to a source of reference voltage 18 supplying a voltage $E_1$. Comparator means 16 compares the two voltages applied to it and provides a ramp control signal when the ramp voltage becomes equal to reference voltage $E_1$. The ramp period control signal, from comparator means 16, is applied to a monostable multivibrator 18, via lead 17, which develops a switching pulse of a selected width. The switching pulse is applied, via lead 19, to a conventional amplifier means 20 whose output terminal is connected to ramp generator input lead 14.

Ramp generator output lead 12 is also connected to one input terminal of a second comparator means 22 whose other input terminal is connected to the analog input voltage terminal 24 to which the analog voltage to be converted is applied. Comparator means 22 provides a time duration control signal along its output lead 25 when the ramp voltage from output lead 12 becomes equal to the analog voltage to be converted.

The time duration control signal from comparator means 22 is applied, via output lead 25, to the set terminal of a bistable multivibrator 26. Multivibrator 26 supplies the time duration signal which is applied, via output lead 27, to the output terminal 28. The switching signal from monostable multivibrator 18 is also applied to the clear terminal of bistable multivibrator 26 via lead 29.

Ramp generator 10 comprises a differential amplifier 30, having a pair of input terminals which are respectively designated as A and B and an output terminal which is connected to ramp generator output lead 12. A negative feedback path is provided by a capacitor 32 connected between the amplifier output terminal and input terminal A. A source of constant voltage $E_b$ has its negative terminal grounded and its positive terminal connected, via a resistor 36, to input terminal A of the differential amplifier. The amplifier arrangement so far described is a Miller integrator arrangement.

A potentiometer, shown in the form of a resistor 38, is connected between voltage source 34 and ground, and has its center tap 40 connected to input terminal B of differential amplifier 30. There is also provided a positive feedback path between the ramp generator output terminal and input terminal B which includes the serial combination of an inverter 42 and a resistor 44.

A discharge means for capacitor 32 is formed by a discharging resistor 46 in series with a normally open discharging switch 48 which are connected across capacitor 32. Discharging switch 48 is closed by actuating a switch relay 50 which has applied to it the switching signal from ramp generator input lead 14. There is also shown an impedance conversion means 52 which is connected in series between the capacitor feedback path and terminal A of differential amplifier 30 so that junction point 53 becomes a high input impedance terminal when looking in the direction of differential amplifier 30.

Referring now to the operation of the analog voltage to time duration converter of this invention, the device may be started by closing switch 54 to apply an initial trigger pulse to monostable multivibrator 18 via lead 17. Multivibrator 18 provides a short duration pulse, the duration of which is selected to be as short as possible but sufficiently long to allow the ramp voltage to flyback, and is usually of a few milliseconds. The pulse provided by multivibrator 18 is shown in graph A of FIGURE 2 and designated by reference character 60, and has time duration $t_1$. The time of the leading edge of pulse 60 is arbitrarily designated as time 0.

Pulse 60, after suitable amplification by amplifier 20, is applied to relay 50 to close switch 48 during the time interval $t_1$. Closure of switch 48 causes capacitor 32 to discharge through resistor 46. Since it is desired to discharge capacitor 32 in the shortest possible time, the resistance of resistor 46 is selected to be just large enough to protect switch 48 from damage due to excessive current flow. It has been found that a resistor of about 100 ohms provides sufficient protection for a mechanical switch and allows a discharge time which is small compared with $t_1$.

The trigger pulse from amplifier 26 is also applied to clear bistable multivibrator 26 at the time $t=0$ so that time duration output lead 27 becomes low when multivibrator 18 is triggered. Closing of switch 48 connects ramp generator output lead 12 to input A of amplifier 30 which drives the amplifier output voltage positive to equal the voltage applied to its input B which is $E_2$. The increase of the output voltage to its initial value on lead 12 happens very fast and in less time than the pulse width of trigger pulse 60 supplied by multivibrator 18.

Upon opening switch 48, a linear rundown of the amplifier output voltage on lead 12 is initiated, as capacitor 32 is charged through resistor 36, which is shown by the linear ramp 70 of graph B of FIGURE 2. The ramp voltage is applied to comparator 16 and compared with the reference voltage $E_1$. As soon as the ramp voltage equals the reference voltage $E_1$, comparator 16 provides the ramp period control signal which initiates the next cycle by which switch 48 is closed as before. Accordingly, the ramp generator output voltage on lead 12 has a maximum value of $E_2$, determined by the voltage applied to input B of amplifier 30, and has a minimum voltage $E_1$, determined by reference voltage 18 as best seen in FIGURE 2, graph B.

The time between closing of switch 48 and the end of the rundown of the ramp generator output voltage is designated by T and is the period of the ramp voltage. It is, therefore, seen that the arrangement so far described comprises a sawtooth wave generator having an internal time reference provided by $E_1$, $E_2$ and the slope of the ramp voltage. The slope of the ramp voltage rundown depends on the time constant of the R-C circuit comprising capacitor 32 and resistor 36, and may be changed to suit. The maximum voltage of the ramp voltage may be changed with the aid of potentiometer 38 which determines the voltage $E_2$. The voltage reference 18 determines the minimum voltage $E_1$. A change of either of these voltages produces a corresponding change in the period T providing that the slope of the ramp is kept constant.

The analog input voltage to be converted is applied to analog input terminal 24 and compared with the ramp voltage by comparator 22. When the ramp voltage equals the analog input voltage, comparator 22 generates the time duration control signal which sets bistable multivibrator 26, thereby making time duration output lead 27 high. Multivibrator 26 remains set until the end of the ramp period T at which time it is reset by the switching signal on lead 29. This is best shown in graph C of FIGURE 2 where the interval $t_a$ is a direct measure of an analog voltage $E_a$ applied to analog input terminal 24. The analog input voltage $E_a$ is shown on graph B, point 71. Here the ramp voltage equals $E_a$ and initiates the time duration control signal to set bistable multivibrator 26. Graph D of FIGURE 2 illustrates the time duration obtained with a lower analog input voltage $E_b$ providing a time interval equal to $t_b$. This lower input voltage $E_b$ is represented on graph B at point 72.

In the analog voltage to time duration converter of this invention, the flyback time of the ramp voltage to its maximum value $E_2$ is of the order of one millisecond or less. Accordingly, the pulse from monostable multivibrator 18 may be selected of a duration of the order of a few milliseconds. For a ramp period T of the order of 10 seconds, therefore, the percentage of the time of the ramp period occupied by the flyback time is of the order of one-tenth of a percent. Therefore, the analog voltage to be converted may have a range anywhere between $E_1$ and $E_2$, thereby providing a range considerably larger than the range of conventional analog to time duration converters.

While this invention may be utilized with prior art ramp generators, the particular ramp generator here shown and described has been found to have a number of advantages. It has a very short flyback time. Also, the positive feedback loop, comprised of inverter 42 and resistor 44, has been found to compensate for sag in the output voltage, thereby increasing the linearity to a very substantial extent.

Further, if differential amplifier 30 is selected of the inexpensive transistor type, it has been found that an impedance transformer 52 has to be provided since the input impedance to a transistorized amplifier is usually low, and draws current which then becomes unavailable for charging capacitor 32. A very suitable impedance transformer is obtained by utilizing a field effect transistor in the amplifier input stage. If differential amplifier 30 includes vacuum tubes, the input impedance is usually sufficiently high so that there is no necessity for an additional impedance transformer.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims.

I claim:

1. A device for converting an analog signal to a time duration pulse having a width which is a function of the amplitude of said analog signal, said device comprising:
- ramp voltage generator means for generating a substantially linearly varying signal;
- a source of reference voltage;
- first comparator means for comparing said signal from said ramp voltage generator means with said reference voltage, said first comparator means producing a resetting signal when said compared quantities are equal;
- means for resetting said ramp voltage generator means in response to said resetting signal to control the period of said linearly varying signal;
- second comparator means for comparing said signal from said ramp voltage generator means with the analog signal to be converted, said second comparator means producing a time duration control signal when said compared quantities are equal; and
- pulse means responsive to said time duration control signal for producing a variable width pulse whose duration in relation to the duration of said period is a measure of the amplitude of the analog signal to be converted.

2. A device in accordance with claim 1 in which said pulse means is also responsive to said resetting signal.

3. A device in accordance with claim 1 in which said pulse means is set by said time duration control signal and reset by said resetting signal.

4. A device in accordance with claim 3 in which said pulse means is a bistable multivibrator.

5. A device for converting an analog voltage to a time duration pulse having a width which is a function of the amplitude of said analog voltage, said device comprising:
- ramp voltage generator means for generating a substantially linearly varying signal;
- a source of reference voltage;
- first comparator means connected to the output of said ramp voltage generator means and to said source of reference voltage, said first comparator means producing a resetting signal when said linearly varying signal from said ramp voltage generator means equals the reference voltage from said source;
- means for resetting said ramp voltage generator means in response to said resetting signal to initiate a new period of said linearly varying signal;
- second comparator means jointly responsive to the output from said ramp voltage generator means and to the analog voltage to be converted for producing a time duration control signal when said analog voltage equals the output from said ramp voltage generator means; and
- pulse means responsive to said time duration control signal and said resetting signal for producing a pulse whose width is a measure of the amplitude of said analog voltage.

6. A device according to claim 6 in which said pulse width is turned on by said time duration signal and is turned off by said resetting signal.

7. A device for converting an analog voltage to a time duration pulse having a width which is a function of the amplitude of said analog voltage comprising:
- ramp voltage generator means for generating a substantially linearly varying signal;
- first comparator means connected to the output of said ramp voltage generator means;
- a reference voltage source connected to said first comparator means, said first comparator means producing a resetting signal when the output from said ramp voltage generator means equals said reference voltage;
- means for resetting said ramp voltage generator means in response to said resetting signal to initiate the commencement of the next period of said linearly varying signal;
- second comparator means jointly responsive to the output from said ramp generator and to said analog voltage for producing a time duration control signal when said analog voltage equals the output from said ramp generator; and
- variable width pulse producing means connected to the output of said second comparator and said means for resetting for producing a variable width pulse whose duartion is commensurate with the interval between the occurrence of said time duration control signal and said resetting signal.

References Cited

UNITED STATES PATENTS

| | | | |
|---|---|---|---|
| 2,885,662 | 5/1959 | Hansen | 328—127 |
| 2,984,788 | 5/1961 | Korff et al. | 328—128 |
| 3,278,737 | 10/1966 | Germain | 307—88.5 |

FOREIGN PATENTS

| | | |
|---|---|---|
| 935,024 | 8/1963 | Great Britain. |

OTHER REFERENCES

Picciano, Post & Vogl, Jr.: "Electronic Integration System for Low Level Fast Signals," IBM Technical Disclosure Bulletin, vol. 4, No. 12, p. 105, May 1962.

ROY LAKE, *Primary Examiner.*

L. J. DAHL, *Assistant Examiner.*